United States Patent
Tareen et al.

(10) Patent No.: US 12,089,786 B2
(45) Date of Patent: Sep. 17, 2024

(54) HAND-HELD IMMERSION BLENDER

(71) Applicant: VITA-MIX MANAGEMENT CORPORATION, Olmsted Township, OH (US)

(72) Inventors: Saifur Tareen, Copley, OH (US); Rebecca Hammond, Rocky River, OH (US); David J. Kolar, Stow, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 485 days.

(21) Appl. No.: 17/128,646

(22) Filed: Dec. 21, 2020

(65) Prior Publication Data

US 2021/0186268 A1 Jun. 24, 2021

Related U.S. Application Data

(60) Provisional application No. 62/951,367, filed on Dec. 20, 2019.

(51) Int. Cl.
*A47J 43/07* (2006.01)
*A47J 43/044* (2006.01)
*A47J 43/10* (2006.01)

(52) U.S. Cl.
CPC ......... *A47J 43/0755* (2013.01); *A47J 43/044* (2013.01); *A47J 43/0711* (2013.01); *A47J 43/10* (2013.01); *A47J 2043/04427* (2013.01)

(58) Field of Classification Search
CPC ..... A47J 43/10; A47J 43/0711; A47J 43/0755
See application file for complete search history.

(56) References Cited

U.S. PATENT DOCUMENTS

| | | |
|---|---|---|
| D345,076 S | 3/1994 | Saltet |
| D394,367 S | 5/1998 | Littmann |
| D400,756 S | 11/1998 | Henderson |
| D533,022 S | 12/2006 | Piret |
| D534,032 S | 12/2006 | Lloyd |

(Continued)

FOREIGN PATENT DOCUMENTS

GB 2572937 A * 10/2019 ............ A47J 27/004

OTHER PUBLICATIONS

Chew Fun Multipurpose Immersion Hand Blender, Date First Available on Amazon.com Apr. 2, 2019, https://www.amazon.com/dp/B07Q4T4NVV/ref (Year: 2019).

*Primary Examiner* — Elizabeth Insler
(74) *Attorney, Agent, or Firm* — Dinsmore & Shohl LLP

(57) ABSTRACT

A hand-held appliance having a housing with a top portion and a bottom portion that houses a motor and a temperature sensor configured to monitor the motor temperature and, if the temperature reaches a predetermined threshold, trigger removal of power until the temperature is below the threshold. The motor is controlled via a power button located on an external face of the housing. The housing includes a speed-set-button located on an external face of the housing controlling the speed of the motor and a plurality of lights corresponding to the respective speed thereof. The bottom of the housing includes a coupling portion configured to receive an attachment such as a blending assembly, whisk, frothing assembly, or other attachment. The housing further includes a sensor configured to monitor motor performance and applied load and, if the load exceeds a predetermined threshold, trigger removal of power from the motor.

19 Claims, 2 Drawing Sheets

(56) References Cited

U.S. PATENT DOCUMENTS

| | | |
|---|---|---|
| D638,656 S | 5/2011 | Brinckerhoff |
| D649,394 S | 11/2011 | Grabes |
| D651,041 S | 12/2011 | Bachmann |
| D662,765 S | 7/2012 | Grabes |
| D663,573 S | 7/2012 | Nordwall |
| D668,099 S | 10/2012 | Ferraby |
| D681,391 S | 5/2013 | Agren |
| D691,412 S | 10/2013 | Ragot |
| D695,565 S | 12/2013 | Verbrugge |
| D724,373 S | 3/2015 | Jl |
| D724,374 S | 3/2015 | Sanguinetti |
| D726,496 S | 4/2015 | Vu |
| D731,236 S | 6/2015 | Yin |
| D751,858 S | 3/2016 | Zhang |
| D798,652 S | 10/2017 | Muller |
| D805,345 S | 12/2017 | Ho |
| D817,081 S | 5/2018 | Verbrugge |
| 9,999,320 B2* | 6/2018 | Dickson, Jr. ........ B01F 27/1126 |
| D846,340 S | 4/2019 | Gan |
| D886,512 S | 6/2020 | Thun |
| D911,095 S | 2/2021 | Koszylko |
| D912,460 S | 3/2021 | Ye |
| D922,132 S | 6/2021 | Gee |
| D930,424 S | 9/2021 | Bourgeois |
| 2005/0078549 A1 | 4/2005 | Hamelin |
| 2008/0043569 A1 | 2/2008 | Moschetti |
| 2008/0221739 A1* | 9/2008 | Pryor .................. A47J 43/0766<br>700/292 |
| 2011/0310270 A1 | 12/2011 | Gladnick |
| 2013/0057675 A1 | 3/2013 | Jaeaeskelaeinen |
| 2016/0128515 A1* | 5/2016 | Edmonds ................ A23L 3/365<br>99/483 |
| 2016/0309960 A1* | 10/2016 | Kolar .................... A47J 43/046 |
| 2017/0055775 A1* | 3/2017 | Hoare .................... A47J 43/06 |

* cited by examiner

HAND-HELD IMMERSION BLENDER

CROSS REFERENCE TO RELATED APPLICATIONS

This application claims priority to U.S. Provisional Patent Application No. 62/951,367 entitled "HAND-HELD IMMERSION BLENDER" filed on Dec. 20, 2019 which is hereby incorporated by reference in its entirety.

TECHNICAL FIELD

The present teachings relate to a hand-held immersion blender systems and methods thereof, and more particularly, to a hand-held immersion blender or blending system capable of single-handed operation and including a sensor.

BACKGROUND

Hand-held kitchen appliances may include immersion blenders, frothing devices, whisking devices, or any other attachment suitable for a motorized kitchen appliance. Immersion blenders (sometimes referred to as "stick blenders" or "wand blenders") are hand held kitchen appliances that have rotary cutting blades that are immersed in a substance to be blended. Immersion blenders facilitate food to be blended in, for example, a cooking vessel. Often, immersion blenders, as well as frothing devices, whisking devices, and other similar handheld kitchen appliances, have an elongated form with controls (e.g., on/off controls, speed setting controls, etc.) on one end of the elongated form. The other end includes the mixing element, such as blades, frothing attachment, whisking attachment, etc., that is connected to an electric motor via a drive shaft. An immersion blender may also include a bell (sometimes referred to as a "hood") that defines a space within which the blades spin.

Traditionally, these handheld kitchen appliances require the use of both hands: one hand to simultaneously hold the appliance and press the control buttons to keep the motor running while requiring the other hand to adjust motor speed via a mechanism such as a speed knob. When using a hand-held kitchen appliance, however, the user is typically also needed to use one hand to hold the mixing-bowl or container housing the foodstuff while the other hand operates the appliance. If the user releases his hand from the bowl or container to adjust the motor speed, he or she risks spilling of the ingredients from an un-stable bowl.

Accordingly, there is a need for an improved hand-held kitchen appliance. And more particularly, a hand-held kitchen appliance that is operable with one hand so that the user may hold the container housing the foodstuff. Further, there is a need for a hand-held kitchen appliance having one or more sensing devices.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Disclosed is a hand-held appliance including a housing that houses a motor, at least one sensor disposed within the housing, a control panel comprising at least two user interface devices, and a display located on the housing.

Also disclosed is a hand-held appliance including a housing with a top portion and a bottom portion that houses a motor and a temperature sensor configured to monitor the motor temperature and, if the temperature reaches a predetermined threshold, trigger removal of power until the temperature is below the threshold. The motor is controlled via a power button located on an external face of the housing. The housing further includes a speed-set-button located on an external face of the housing that controls the speed of the motor and a plurality of lights corresponding to the respective speed of the motor. The bottom of the housing includes a coupling portion configured to receive an attachment such as a blending assembly, whisk, frothing assembly, or any other kitchen appliance attachment. The housing further includes a sensor configured to monitor motor performance and applied load and, if the load exceeds a predetermined threshold, trigger removal of power from the motor.

BRIEF DESCRIPTION

DESCRIPTION

Figure 1:
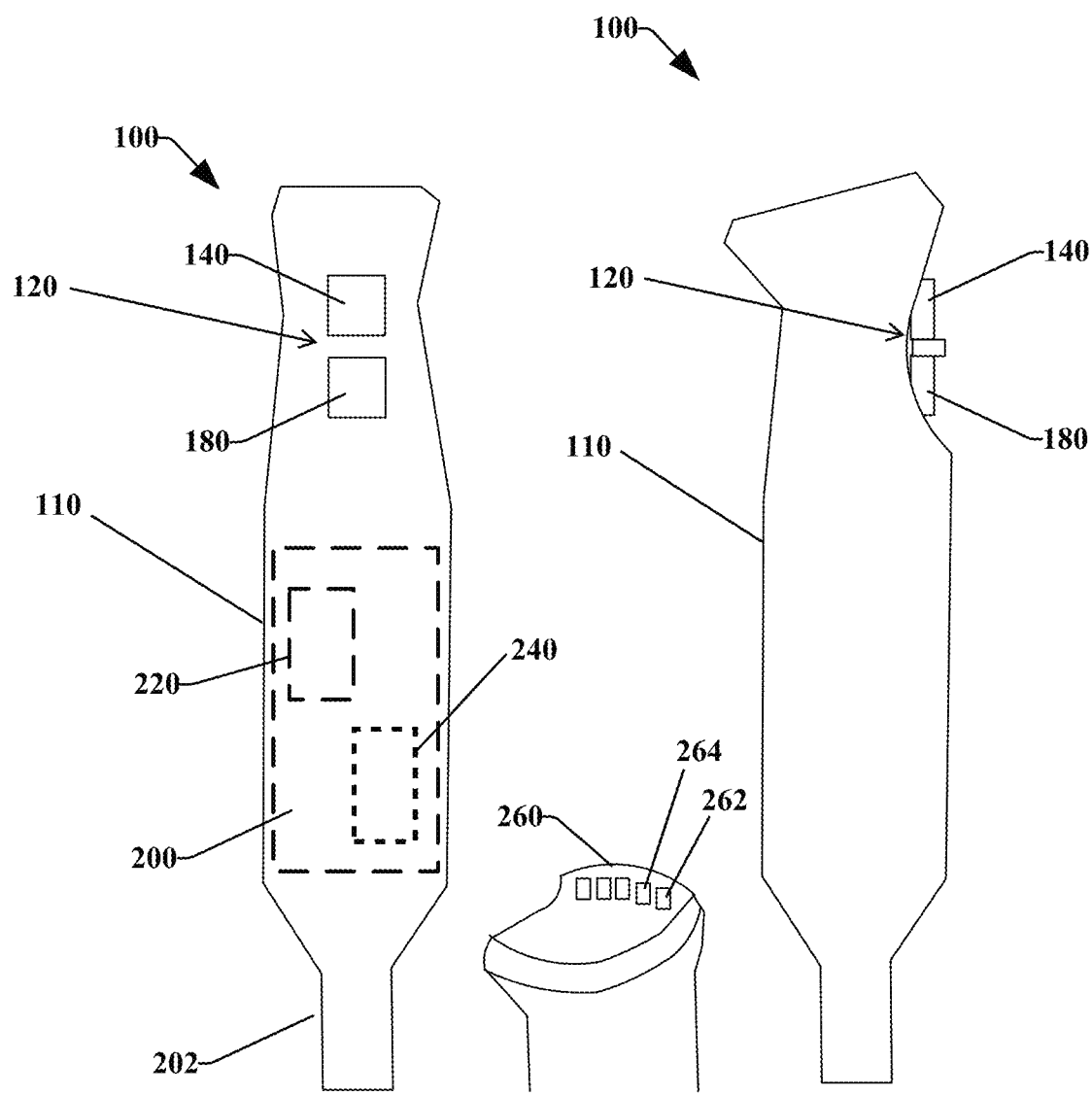
FIG. 1 is a schematic of the top half of a hand-held blending system.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

The terms "identification tag," "chip," "NFC component," and the like may be used interchangeably, unless context suggests otherwise or warrants a particular distinction among such terms. Such may refer to an NFC component or tag, which may be capable of sending/receiving a signal. It is noted that embodiments may utilize other radio frequency identification (RFID) devices, transponders, or tags. Accordingly, embodiments reference NFC for brevity, but such embodiments may utilize other RFID devices, methods, or systems. It is further noted that RFID tags may be chosen based on a frequency (e.g., low frequency RFID tags for close communication). Identification tags may comprise printable RFID tags, NFC tags, tags including microchips, or the like. Identification tags can contain stored information, such as in a memory (e.g., read-only memory (ROM), random access memory (RAM), electrically erasable programmable read-only memory (EEPROM), or various other types of memory). In another aspect, an identification tag may be powered by electromagnetic induction from magnetic fields produced by a reader. For instance, an identification tag may include an NFC component that uses induction between two loop antennae located within the container's near field, effectively forming an air-core transformer. The antennae may comprise various materials, such as copper. While an air-core transformer is described, various other antennae formations may be utilized.

In an example, an NFC component may include an NFC tag and an NFC emitter. The NFC tag and NFC emitter may each include one or more antennae. For instance, the NFC tag may include a loop antenna and the NFC emitter may include another loop antenna. It is noted that the loop antennae may or may not be substantially similar to each other. The NFC tag antenna and NFC emitter antenna may be operatively coupled via an electromagnetic field. The coupling may form or represent an air-core coil or transformer. The NFC emitter may generate an alternating current that may be received by the NFC emitter antenna. The current may induce an electromagnetic field through the air or another carrier medium. The electromagnetic field may induce a current in the NFC tag antenna. The received current may provide power to various components of the NFC tag.

In various embodiments, an NFC tag may include the antenna (e.g., inlay), a processor, and a memory device. The memory device may include various types of memory, such as electrically erasable programmable read-only memory (EEPROM) and the like. When the NFC tag is powered (e.g., current induced by the electromagnetic field), the NFC tag may generate a response that may be received by the NFC emitter.

It is noted that the various embodiments described herein may include other components and/or functionality. It is further noted that while various embodiments refer to a hand-held blender, various other systems and hand-held appliances may be utilized in view of embodiments described herein. For example, embodiments may be utilized in food processor systems, mixing systems, various other food preparation systems, home appliances, or other hand-held kitchen appliances using motors, such as frothers and electric whisks. As such, references to a hand-held blender, blending system, and the like, are understood to include the various other machines.

FIG. 1 is a schematic of the top half or hand-held portion of a hand-held kitchen appliance or blending system 100 that is operable with one hand, e.g., an immersion blender. The appliance/blending system 100 includes a housing 110 and control panel 120. The housing 110 may house a motor 200 and other electrical and mechanical components such as a receiver, transmitter, memory, power source such as a battery, drive shaft, and the like. The motor 200 may be controlled by the control panel 120. The appliance/blending system 100 may further include a display 260. The display 260 may include a liquid crystal display, light emitting diode (LED) display, or the like. In an example, the display 260 includes a plurality of LEDs 262, 264 that may be arranged in a display bar. The display 260 may include any number of LEDs, including 1, 2, 3, 4, 5, 6, 7, 8, 9, 10, etc. LEDs. Each LED may have its own color or be able to switch or present multiple colors, and may have its own blinking pattern or on/off notification so as to visually indicate information to the user as further described herein.

The control panel 120 may include one or more user interfaces. In an example, the control panel 120 includes user interface controls. In an example, the control panel 120 includes at least two buttons. The control panel 120 and buttons may be positioned on a side of the housing 110. In an embodiment, the control panel 120 may be positioned ergonomically so that the user may use or press the buttons while holding the device at the same time and with the same hand. The at least two buttons may include a power button 140 and a motor speed button 180 that controls the speed of the motor. The power button 140 may be referred to as a motor run button. The motor speed button 180 may be referred to as a speed-set-button.

In an embodiment, when the power button 140 is released, the motor will be de-energized and stop running. A user may selectively control the power to the motor 200 by pressing the power button 140 and maintaining the power button 140 as pressed to energize the motor via power from a power source, e.g., a power cord connected to power mains or outlet, an internal battery (e.g., rechargeable battery, disposable battery, etc.). When the power button 140 is pressed, the motor 200 is energized and capable of adjustment by the user. Alternatively, the actuation and de-actuation of the power button 140 may be controlled by a press of the power button 140 to turn the device on and another press of the power button 140 to turn the device off. The power button 140 may also include a slideable switch, or the like, rather than a depressable button, etc. In other embodiments, the power button 140 may operate such that once depressed the power to the motor 200 to operate such is provided. In these embodiments, the power button 140 may then be depressed again to stop power to the motor 200 to stop it from operating.

The speed-set-button 180, may comprise a momentary button. When pressed, this increases the speed setting of the motor 200 and/or the longer it is depressed the more power is provided. The motor 200 may be configured to have at least two speeds and up to five or more speeds that may be selected by the user pressing (or pressing and holding) the speed-set-button 180. The motor 200 may further be configured to ramp its speed such that the attachment gradually reaches the desired speed as opposed to abruptly moving from sedentary to full-speed operation, thus reducing the risk of added mess from splashed foodstuff. In an embodiment, each time the speed-set-button 180 is pressed, the motor speed may increase by one step and a corresponding LED may light up on the display 160. For example, if the user pressed the speed-set-button 180 three times, a motor speed corresponding to speed setting number three would result and three LED lights would be illuminated on the display 160 to signal speed setting number three. Alternatively, a user may press and hold the speed-set-button 180 for a predefined amount of time (e.g., one second for each level) such that the longer the user depresses the speed-set-button 180 the higher the level of power applied. For example, the user may depress and hold the speed-set-button 180 for 3 seconds, which may shift the motor speed corresponding to speed setting number three and would result in three LED lights being illuminated on the display 160 to signal speed setting number three. Alternatively, the display 160 may show the number 3 to convey the current speed setting.

The user may press the speed-set-button 180 when the motor 200 is running or when the motor 200 is stopped, i.e., when the power button 140 is in an on or an off position. If the speed-set-button 180 is pressed and set to a particular speed when the power button 140 is off, then the device may start at that set speed if the power button 140 is turned on within a certain amount of time, for example, such as 1-30 seconds. Once a maximum speed is reached, selecting the speed-set-button 180 may either adjust the speed to the lowest speed setting or may result in no change in speed. In some embodiments, the display 160 may generate a notification identifying that the maximum speed has been reached and the motor 200 cannot increase speed.

While embodiments may refer to two buttons including a power and motor speed button, it is noted that other buttons may also be included. Additionally, the function of the buttons may vary based on the number of times pressed or the extent of the depression. For example, the speed of the blending may be increased by subsequently pressing the motor speed button 180. In an embodiment, one press may result in a slow speed, a second press may result in an increased medium speed, a third press may result in an increased higher speed, and so on. The display 160 may reflect the set sped by a number, the number of LEDs illuminated, etc. In another example, speed of the blending may be increased by the extent of pressing of the motor speed button 180. In an embodiment, a slight press may result in a slow speed, an increased press may result in an increased medium speed, a deep press may result in an increased higher speed, and so on. It is noted that the control panel may also include a single button that both serves to power the device and set the speed of the device. For example, a first press or a slight press may both actuate power the device on and power the device at an initial speed.

Other settings aside from increased and decreased speed may also be actuated by the control panel 120 and buttons. For example, in addition to the motor speed button 180 controlling the speed of the motor and device, the motor speed button 180 may also include options for speed patterns. For example, a first speed pattern may include a gradual speed from no speed to medium speed and include a certain number of bursts of a higher speed and a lower speed. Certain patterns and variations between speeds may be useful for certain recipes or foodstuff, including smoothies, salsas, soups, etc. and may prevent overheating or malfunction of the device from becoming clogged.

The control panel 120 and the buttons 140, 180 may be on a single side of the housing 110 such that a user may be able to depress, actuate, or otherwise move the motor speed button 180 and/or the power button 140 with a single hand while also being able to manually manipulate the blending system 100. The user doesn't need to use a second hand to initiate depression, actuation or manipulation of the motor speed button 180 and/or the power button 140 with a different hand or portion thereof.

In another embodiment, the housing 110 or appliance/blending system 100 may further include a temperature sensor 220 located proximate motor 200. The temperature sensor 220 may be configured to sense the temperature within the housing 110, such as the temperature of the motor 200. The temperature sensor 220 may continuously sense the temperature or otherwise iterate sensing of the temperature while the motor 200 is running to ensure proper functioning of the appliance 100. If the temperature of the motor 200 reaches the maximum recommended operating temperature, the sensor 220 may be configured to communicate with the motor 200 and trigger a de-energized state that remains until the motor 200 temperature has fallen to safe limits. The temperature sensor 220 may be communicatively coupled to the display through a controller or circuitry. The display 160 may generate a notification in response to the temperature sensor 220 triggering the de-energized state. The display may include a different color display, such as red, a different pattern display, such as blinking, or the like.

In another embodiment, the housing 110 or appliance/blending system 100 may further include a stall sensor 240 that monitors motor's performance continuously. If the motor 200 stalls, such as due to excessive load or a hard ingredient becoming stuck within the blending blades or other attachment, this will cause an unfavorable condition for the motor 200, thus risking fatigue and failure on the materials. The stall sensor 240 may detect such conditions and trigger a de-energized state that remains until the issue is resolved to save the motor 200 from over-heating. The stall sensor 240 may be communicatively coupled to the display through a controller or circuitry. The display 160 may generate a notification in response to the stall sensor 240 triggering the de-energized state. The display may include a different color display, such as red, a different pattern display, such as blinking, or the like.

In embodiments, the appliance/blending system 100 may be configured to receive an attachment. The appliance/blending system 100 may receive the attachment on the bottom portion of the housing 110, opposite the display 160, such as by coupling the attachment to a drive shaft 202. The attachment may manipulate foodstuff. In examples, the attachment may comprise a blade assembly, a frothing assembly, a whisking assembly, or the like. The attachments may couple with the top portion of the housing 110 via a recessed portion, a bayonet connection, a friction fit connection, an interlocking device, a threaded assembly, or any other fasteners suitable for coupling the attachment to the housing 110 so that the attachment may operate in conjunction with the motor 200 and by the drive shaft 202.

In another embodiment, the appliance/blending system 100 is configured to communicate with the attachment via NFC or any other equivalent means of communication. The housing 110 may include an NFC component that may interact with an NFC component of a coupled attachment. The NFC component of the housing 110 may receive information regarding the type of container holding the foodstuff, the type of foodstuff in the container, or information regarding the coupled attachment such as the functionality of the coupled attachment, whether the attachment is properly or operatively coupled, etc. The appliance/blending system 100 may utilize the information to determine a blending or other process to be utilized by the system. For example, the maximum or minimum speed that the attachment rotates may depend on the specific attachment attached. The particular attachment may include an NFC component that communicates with an NFC component on the housing of the appliance 100. This may allow the appliance/blending system 100 to know the type of attachment operatively attached and may set a maximum or minimum speed of the attachment based on its most effective performance parameters. The NFC component may communication with the motor 200 to control the speed of the attachment. While speed is described, any kind of characteristic of the attachment may be controlled as described herein.

Figure 2:
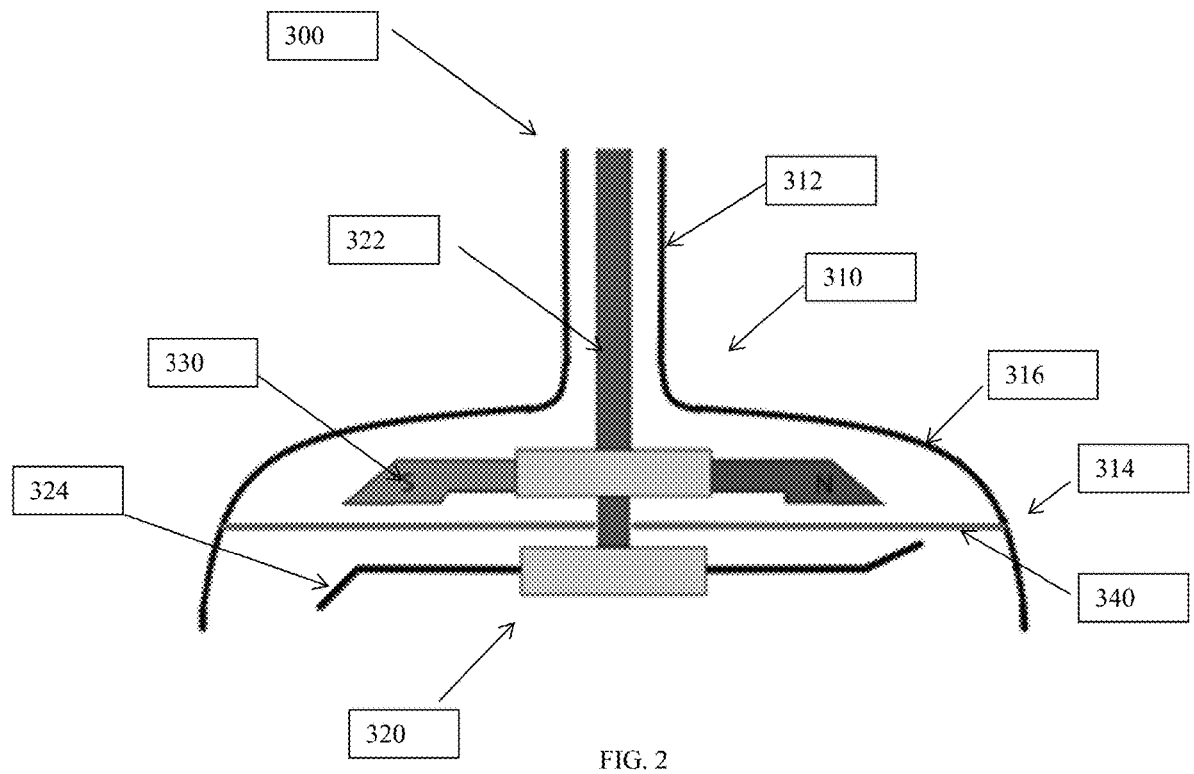
FIG. 2 is a cross-sectional view of the lower half of a hand-held blending system.

FIG. 2 illustrates a cross-sectional view of the lower half or mixing portion of a hand-held kitchen appliance or blending system 300 that is inserted and directed into foodstuff by a user to effectuate blending, such as an immersion blender. This lower half or mixing portion of a hand-held kitchen appliance or blending system 300 may also comprise the coupled attachment for selective attachment to the top half or hand-held portion of a hand-held kitchen appliance or blending system 100 shown in FIG. 1. The immersion blender may be of any appropriate configuration and is not limited to that shown in the drawings. The blending system 300 may comprise a housing 310 that may include a shaft 312 and a blending portion 314. The shaft 312 may extend from the blending portion 314 and may include an elongated handle having the control buttons located along the top portion of the housing as illustrated in FIG. 1. The shaft 312 may include a drive shaft 322 for the motor 200 to operate the attachment 300.

The handle may comprise an ergonomically shaped housing, a motor, a power source (e.g., battery, connection to a power outlet, etc.), a temperature sensor, a motor sensor, and other operative components such as those described herein in reference to FIG. 1. The motor may drive a drive shaft 322 disposed within the shaft 312. The shaft 312 may protect the drive shaft 322 from damage or exposure to foodstuff, liquids, or debris. The drive shaft 322 may be operatively coupled to a blade assembly 320 or any other kitchen mixing appliance attachment such as a whisk or frothing device. When attached, the shaft 312 of the attachment may selectively couple with the shaft 202 of the housing 110. When attached the drive shaft 322 may selectively couple with the motor 200 of the housing 110 or other connection between the drive shaft 322 and the motor 200.

The blending portion 314 may include a blade assembly 320, a magnet 330, an exciter 340, and a shield or body 316. As described herein, a portion of the housing 310, (e.g., the blending portion 314), may be selectively inserted and directed into foodstuff to effectuate blending of foodstuff by the blade assembly 320 and controlled by the motor 200. In an embodiment, the blending portion 314 is inserted into a separate container that holds foodstuff. The blending portion 314 is operable with one hand of the user via a set of buttons on a control panel including power button 140 and speed-set-button 180, as described above.

The blade assembly 320 or any other kitchen appliance attachment, e.g. whisk or frothing attachments, may be removably coupled to the drive shaft 322. The blade assembly 320 may primarily comprise one or more blades 324 operatively attached to the drive shaft 322, which may be driven by the motor through the drive shaft 322 and monitored by one or more sensors proximate the motor.

The blending portion 314 may include a cup portion 316 (also referred to as a shield or body) that may comprise a generally downwardly turned cup shape. It is noted that the cup portion 316 may include apertures or openings formed therein or other features that may allow for the flow of foodstuff during blending. The cup portion 316 may also include teeth or other features on its edge to assist the breaking up of foodstuff during use. It is further noted that the cup or bell bottom portion may be of a scratch resistant material.

The magnet 330 may be attached to the drive shaft 322 and may be disposed between the cup portion 316 and the blade assembly 320 or exciter 340. In some embodiments, the blades 324 may be magnetized; or still further, the magnet 330 may be incorporated into or integrated with the blades 324. In some embodiments, the magnet 330 may be operatively disposed within a closed chamber. For instance, the exciter 340 may enclose the magnet 330 within a chamber defined between the cup portion 316 and the exciter 340. This may prevent the magnet 330 from being exposed to foodstuff during blending. The magnet 330 may be of any appropriate configuration. For example, the magnet 330 may comprise a permanent magnet being neodymium iron boron (NdFeB) magnet, samarium cobalt (SmCo) magnet, alnico magnet, ceramic or ferrite magnet, a temporary magnet, an electromagnet or any combination of the foregoing. In the embodiment shown, the magnet 330 comprises an electromagnet. The magnet 330 may be activated via a button on the control panel of the top portion of the housing 110 for the user to activate should heated blending be desired.

The exciter 340 may be positioned at or within the cup portion 316 of the blending portion 314. In some embodiments, the exciter 340 may be directly exposed to foodstuff during blending. In other embodiments, the exciter 340 may be hermetically sealed from the foodstuff, such as by overmolding the exciter 340 at or within the cup portion 316 of the blending portion 314. At least one example includes the exciter 340 attached to or disposed on or within the cup portion 316. The exciter 340 may comprise a metal material capable of induction. For instance, the exciter 340 may comprise a steel plate. Further, in some embodiments, the exciter 340 may comprise a coil of metal such as a wound solenoid consisting of a number of turns of copper wound around a mandrel. The present teachings are not limited to a defined configuration of an exciter 340. Any appropriate configuration may be utilized.

It is noted that the blade assembly 320, magnet 330, and exciter 340 may comprise similar aspects and orientations as described with reference to the other figures.

During operation of the blade assembly 320, the drive shaft 322 rotates the blades 324 and the magnet 330. Rotation of the magnet 330 induces heat with the exciter 340. As the exciter 340 heats, it may transfer heat to the contents within the blending portion 314 and/or a container (not shown) via conduction. As a result, the foodstuff may also be heated during blending. This may be useful when making items such as soup.

According to at least some embodiments, the blades 324 may be magnetized such that rotation of the blades 324 causes a change to the magnetic flux induced within the insert. In another example, the insert may be magnetized such that rotation of the blades 324 causes magnetic flux and inductive heating. The direction of the current flow is generally perpendicular to the plane in which the magnets are rotating with the magnets rotating concentric to the insert, which may include a metal tube. The magnitude of the current generated may be a function of the rate of change of magnetic flux through the material, the strength of the magnetic field, the thickness of the material, which should be greater than the "skin effect," and the magnetic reluctance of the material. This configuration may heat the items being blended in the container. This may result in the blending system 100 being capable of heating that which it blends.

In this embodiment, the user may be able to control the amount of heating by controlling the speed of the blades. This may be accomplished by utilizing the motor speed button 180 as described above. Specifically, the more speed selected by the user, the warmer the contents in the container or contents being blended may become in a defined period of time. For example, the user may imitate and initial speed (e.g., speed 1) by depressing or actuating the motor speed button 180 once or holding it down for a short-period of time, e.g., one second. To increase the heat over a shorter period of time, the user may continue to depress or actuate the motor speed button 180 (or continue to depress or actuate such) to reach the desired temperature in the desired amount of time. In most embodiments, the longer the contents are blended and the higher the speed of the blades rotating (i.e., the faster the motor causes rotation of the blades) the higher the temperature will be of the blended contents. To increase the temperature, the user can blend for a longer period of time or increase the speed of the blades/motor. The appliance/blending system 100 may include a third button in the control panel 120 that provides an automatic blending program. This button may be set (by the user, by the manufacturer, or programmed through a connected device, such as a smart phone or the like) to operate a defined speed for a defined period of time. The program may be reprogrammable by the user such as through the use of a connected device such as a smart phone, tablet, computer or the like. This may result in the blended end product being at a defined temperature and consistency at the conclusion of the program.

In these embodiments, the appliance/blending system 100 may be operatively coupled with a computer (smartphone, tablet or the like) that may be utilized as a client and/or a server device. As such, computer may include communication connection(s) for connecting to a communication framework. Communication connection(s) may include devices or components capable of connecting to a network. For instance, communication connection(s) may include cellular antennas, wireless antennas, wired connections, and the like. Such communication connection(s) may connect to networks via communication framework. The networks may include wide area networks, local area networks, facility or enterprise wide networks (e.g., intranet), global networks (e.g., Internet), satellite networks, and the like. Some examples of wireless networks include Wi-Fi, Wi-Fi direct, BLUETOOTH™, Zigbee, and other 802.XX wireless technologies. It is noted that communication framework may include multiple networks connected together. For instance, a Wi-Fi network may be connected to a wired Ethernet network. In these embodiments, the appliance/blending system 100 may be operatively coupled to the network directly or through the computer. In other embodiments, the appliance/blending system 100 may include Wi-Fi, Wi-Fi direct, BLUETOOTH™, Zigbee, and other 802.XX wireless technologies and may be operatively connected with the computer and/or network. Further, the appliance/blending system 100 may be programmed by the computer or through the computer or the appliance/blending system 100 may be programmed or operated directly via such wireless connection.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A hand-held blending system, comprising:
a handle-shaped elongate housing that houses a motor and at least a portion of a first drive shaft having a proximal end and a distal end, the proximal end of the first drive shaft drivingly engaged with the motor;
a control panel comprising at least two user interface devices;
a display located on the housing;
a second drive shaft configured to selectively couple the first drive shaft to drivingly engage with the motor;
a cup portion positioned at the distal end of the second drive shaft;
a blade assembly operatively coupled with the second drive shaft; and
a magnet positioned at the distal end of the second drive shaft;
wherein the magnet and the blade assembly are disposed within the cup portion to produce a magnetic field to heat the blade assembly.

2. The hand-held blending system of claim 1, further comprising at least one sensor that transmits monitoring signals corresponding to one or more characteristics of the motor.

3. The hand-held blending system of claim 2, wherein the at least one sensor comprises a temperature sensor that transmits signals corresponding to a temperature of the motor.

4. The hand-held blending system of claim 2, wherein the at least one sensor comprises a stall sensor that transmits signals indicating a stall condition of the motor.

5. The hand-held blending system of claim 1, wherein the at least two user interface devices include a power button and a speed button.

6. The hand-held blending system of claim 1, further comprising at least one wireless communication device, selected from a near-field communication device (NFC) device, a Bluetooth device, and a Wi-Fi device.

7. The handheld blending system of claim 1, wherein the magnet is an electromagnet that is actuable via one of the at least two user interface devices.

8. The handheld blending system of claim 1, wherein the blade assembly and the magnet are disposed within the cup portion such that the magnet is positioned between a wall of the cup portion and the blade assembly.

9. The handheld blending system of claim 1, wherein the magnet is incorporated into or integrated with the blades.

10. A hand-held kitchen appliance, comprising:
a handle-shaped elongate housing having a top and bottom;
a motor disposed within the housing;
at least one sensor disposed within the housing; and
a blending attachment removably coupled to the housing, the blending attachment further comprising:
a first drive shaft having a distal end extending from the bottom of the housing and a proximal end drivingly engaged with the motor;
a second drive shaft configured to selectively couple the first drive shaft to drivingly engage with the motor;
a cup portion positioned at the distal end of the second drive shaft;
a blade assembly disposed within the cup portion and operatively coupled with the second drive shaft;
a magnet disposed within the cup portion; and
an exciter disposed within the cup portion and positioned proximate to the magnet to produce a magnetic field to heat the blade assembly.

11. The hand-held kitchen appliance of claim 10, wherein the motor has a predetermined maximum operating load.

12. The hand-held kitchen appliance of claim 10, wherein the motor has a predetermined maximum operating temperature.

13. The hand-held kitchen appliance of claim 12, wherein the at least one sensor comprises a temperature sensor.

14. The hand-held kitchen appliance of claim 13, wherein the temperature sensor is coupled with a power source and removes the power source when the motor is operating at or near the predetermined maximum operating temperature.

15. The hand-held kitchen appliance of claim 10, further comprising at least one wireless communication device, selected from a near-field communication device (NFC) device, a Bluetooth device, and a Wi-Fi device.

16. The hand-held kitchen appliance of claim 15, wherein the at least one wireless communication device communicates information about the blade assembly, wherein the information includes operation, functionality, or proper attachment.

17. The hand-held kitchen appliance of claim 10, wherein the magnet is an electromagnet that is actuable via a user interface device.

18. The hand-held kitchen appliance of claim 10, wherein the magnet may be operatively coupled to the second drive shaft such that the magnet rotates with the second drive shaft.

19. The hand-held kitchen appliance of claim 10, wherein the exciter comprises a barrier that extends radially from the second drive shaft and encloses the magnet within a sealed chamber that is separate from the blade assembly.

* * * * *